United States Patent [19]

Lorenz

[11] Patent Number: 4,942,225

[45] Date of Patent: Jul. 17, 1990

[54] PREPARATION OF DIAZO AND AZO COMPOUNDS USING AZIDOFORMAMIDIUM SALTS

[75] Inventor: Manfred Lorenz, Cologne, Fed. Rep. of Germany

[73] Assignee: Bayer Aktiengesellschaft, Leverkusen, Fed. Rep. of Germany

[21] Appl. No.: 209,254

[22] Filed: Jun. 20, 1988

[30] Foreign Application Priority Data

Jul. 2, 1987 [DE] Fed. Rep. of Germany ....... 3721851

[51] Int. Cl.$^5$ ..................... C07C 247/04; C09B 27/00; C07D 239/62
[52] U.S. Cl. .................................... 534/560; 534/565; 534/587; 534/767; 534/701; 534/738; 534/887
[58] Field of Search ................ 534/560, 565, 587, 767

[56] References Cited

U.S. PATENT DOCUMENTS

| | | | |
|---|---|---|---|
| 3,869,439 | 3/1975 | Schundehutte | 534/767 |
| 4,622,391 | 11/1986 | Lorenz et al. | 534/587 |
| 4,628,082 | 12/1986 | Lorenz et al. | 534/767 |

OTHER PUBLICATIONS

Patai, S., Ed., "The Chemistry of the Azido Group," Interscience Publishers, New York, pp. 352-353, (1971).
Houben-Weyl, "Methoden der Organischen Chemie," vol. X13, pp. 328-329, (1965).

Primary Examiner—Floyd D. Higel
Assistant Examiner—Fiona T. Powers
Attorney, Agent, or Firm—Sprung Horn Kramer & Woods

[57] ABSTRACT

Preparation of diazo compounds by transfer of diazo groups to activated methylene compounds, characterized in that an azidoformamidinium salt is used as the diazo group transferring agent, and also preparation of azo compounds by this route.

14 Claims, No Drawings

PREPARATION OF DIAZO AND AZO COMPOUNDS USING AZIDOFORMAMIDIUM SALTS

Diazo group transfer is a well-known reaction in organic chemistry which has found industrial application. In this reaction, an $N_2$ group is transferred from an azide to an acidic CH activated methylene compound to give a diazo compound which can react with another molecule of the same or another (acidic CH) activated methylene compound to give an azo compound (see for example: M. Regitz and G. Maas in "Diazo Compounds; Properties and Synthesis"; pages 326–435; Academic Press; 1986).

Preferred diazo group transferring agents are sulphonyl azides, in particular toluenesulphonyl azide and benzenesulphonyl azide. These azides have the disadvantage of being impact- and shock-sensitive (see for example Synth. Commun. 11 pages 947–956 (1981)). Furthermore, it can be difficult to remove the sulphonamides which are formed in the course of the reaction from the sulphonyl azides in equimolecular amounts from the reaction mixture. Moreover, azidinium tetrafluoroborates of the type 2-azido-3-ethylbenzothiazolium have, for example, been proposed as reagents for azo group transfer (Helv. Chim. Acta 61, p. 97–103 (1978)). However, these compounds can only be obtained by difficult procedures and deflagrate at temperatures as low as about 100° C.

A further diazo group transferring agent mentioned in the literature is N,N-dimethylamino-azidochloromethyleneimonium chloride (Angew. Chemie 62, p. 754–755 (1980). The stability of this compound is not known; however, it also can only be prepared by a complicated procedure and in the absence of moisture and it is hydrolytically unstable.

It is known from Liebigs Ann. Chem. 729, p. 119–123 (1969) that azobarbituric acid is formed as a byproduct in the reaction between barbituric acid and carbamoyl azide.

Surprisingly, it has now been found that azidoformamidinium salts are highly suitable for use as transferring agents of diazo groups to activated methylene compounds. The invention therefore relates to a process for preparing diazo compounds by transfer of diazo groups to activated methylene compounds, characterized in that azidoformamidinium salts are used as diazo group transferring agents.

Preferred azidoformamidinium salts correspond to the formula

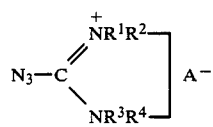

in which
R$^1$, R$^2$, R$^3$ and R$^4$ denote hydrogen, alkyl, preferably C$_1$–C$_6$-alkyl, for example methyl, ethyl, cycloalkyl, preferably C$_3$–C$_7$-cycloalkyl, aralkyl, preferably benzyl, phenethyl and
R$^1$+R$^3$ and/or R$^3$+R$^4$ or R$^2$+R$^3$ including the N atom or the N atoms and the C atom can form a 5- or 6-membered ring, for example a piperidine or a pyrrolidine ring and A$^-$ stands for an anion.

Examples of compounds of the formula I are:

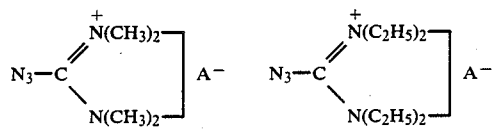

Particular preference is given to using

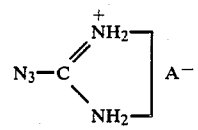

and very particular preference to using azidoformamidinium hydrochloride.

A$^-$ preferably stands for the anion of a mineral acid or a sulphonic acid, for example for Br$^-$, H$_2$PO$_4^+$, methanesulphonate, ethanesulphonate, benzenesulphonate, toluenesulphonate, dodecylbenzenesulphonate and particularly preferably for Cl$^-$, SO$_4^{--}$, HSO$_4^-$ and NO$_3^-$.

Activated methylene compounds are understood to be in particular those compounds which in one of their tautomeric forms have a methylene group

having one or two adjacent atom groups which favour the formation of a carbanion on the C atom of the methylene group. Such compounds are also called acidic CH compounds. Examples of suitable adjacent atom groups are:

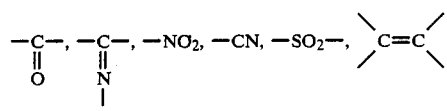

For the purposes of the present invention, activated methylene compounds used are those which are generally used as methylene-active coupling components in the chemistry of azo dyes, for example from the acetoacetic arylide, pyrimidine, pyridine, pyrazole, 2,4-dihydroxyquinoline series or barbituric acid series, preferably of the formulae

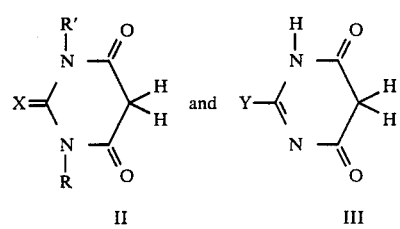

In formula II,
X denotes =O, =N—CN or =NR$^5$,
R$^5$ denotes R,

R, R' denote hydrogen, alkyl, preferably $C_1$–$C_6$-alkyl, cycloalkyl, preferably $C_3$–$C_7$-cycloalkyl, aryl, preferably phenyl and naphthyl or aralkyl, preferably phenyl-$C_1$–$C_4$-alkyl, it being possible for the hydrocarbon radicals given for R to be substituted, for example by —OH, F, Cl, Br, $C_1$–$C_6$-alkyl, $C_1$–$C_6$-alkoxy, —$NO_2$, —CN, —$SO_2NR^6R^7$ or —$CONR^8R^9$, $R^6$, $R^7$, $R^8$, $R^9$ denoting hydrogen, alkyl, preferably $C_1$–$C_6$-alkyl, cycloalkyl, preferably $C_3$–$C_7$-cycloalkyl, aryl, preferably phenyl and naphthyl or aralkyl, preferably phenyl-$C_1$–$C_4$-alkyl, it being possible for the hydrocarbons given for $R^6$, $R^7$, $R^8$, $R^9$ to be substituted, for example by —OH, F, Cl, Br, $C_1$–$C_6$-alkyl, $C_1$–$C_6$-alkoxy, —$NO_2$, —CN, or the radicals $R^6$ and $R^7$ and $R^8$ and $R^9$ together with the N atom forming a 5- or 6-membered ring, preferably a piperidine or morpholine ring.

In formula III
Y has the meanings given above for R, or stands for a heterocyclic radical or a radical

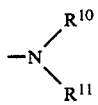

in which
$R^{10}$ has the meanings given above for R or stands for an acyl radical, in particular a radical $R^{12}$—CO— or $R^{13}$—$SO_2$—, $R^{12}$ being hydrogen, amino, arylamino, preferably phenylamino or naphthylamino, alkyl, preferably $C_1$–$C_6$-alkyl, cycloalkyl, preferably $C_3$–$C_7$-cycloalkyl, aryl, preferably phenyl and naphthyl or aralkyl, preferably phenyl-$C_1$–$C_4$-alkyl, it being possible for the hydrocarbon radicals to be substituted, for example by —OH, F, Cl, Br, $C_1$–$C_6$-alkyl, $C_1$–$C_6$-alkoxy, —$NO_2$, —CN;

$R^{13}$ being aryl, preferably phenyl or naphthyl, which can be substituted, for example by —OH, F, Cl, Br, $C_1$–$C_6$-alkyl, $C_1$–$C_6$-alkoxy, —$NO_2$, —CN.

Y, if it means a heterocyclic radical, preferably stands for a 5- or 6-membered hererocyclic radical which can contain 1, 2 or 3 N, O and/or S atoms, and particularly preferably stands for a pyridyl radical.

Suitable activated methylene compounds are for example those pyrimidine derivatives which are listed below as examples of compounds of the formulae (II) and (III).

Suitable activated methylene compounds of the acetoacetic arylide series are for example: acetoacetanilide, acetoacet-2-chloroanilide, acetoacet-2-methoxyanilide, acetoacet-2-methylanilide, acetoacet-2,4-dimethylanilide, acetoacet-2,5-dimethoxy-4-chloroanilide, 5-acetoacetylamino-2-benzimidazolone.

Suitable activated methylene compounds of the pyridine series are for example: 2,6-dihydroxypyridine, 2,6-dihydroxy-3-carbamoyl-4-methylpyridine, 2,6-dihydroxy-3-carboxymethyl-4-methylpyridine, 2,6-dihydroxy-3-carboxyethyl-4-methylpyridine, 1,2-dihydro-6-hydroxy-1,4-dimethyl-3-cyano-2-oxopyridine, 1,2-dihydro-hydroxy-1-ethyl-4-methyl-3-cyano-2-oxopyridine, 2,4,6-trihydroxy-3-carbamoylpyridine, 2,6-dihydroxypyridine-4-carboxylic acid, 2,6-dihydroxy-pyridine-4-carboxamide, 2,4-dihydroxy-pyridine-5-carboxamide, 1,2-dihydro-hydroxy-1,4-dimethyl-2-oxo-pyridine, 1-hydroxy-3-methyl-4-cyanopyrido[1,2-a]benzimidazole and also in particular 2,6-dihydroxy-4-methylpyridine and 2,6-dihydroxy-3-cyano-4-methylpyridine, it also being possible for the pyridine derivatives mentioned to be optionally also further substituted on the ring nitrogen for example by methyl, ethyl, propyl, 2-hydroxyethyl, 2- or 3-hydroxypropyl, benzyl, phenyl.

Suitable activated methylene compounds of the pyrazole series are for example: 3-methyl-1-phenyl-5-pyrazolone, 1-(2-chlorophenyl)-3-methyl-5-pyrazolone, 1-(4-chlorophenyl)-3-methyl-5-pyrazolone, 1-(2,5-dichlorophenyl)-3-methyl-5-pyrazolone, 3-methyl-1-(4-methylphenyl)-5-pyrazolone, 3-methyl-1-(4-nitrophenyl)-5-pyrazolone, 3-methyl-1-phenyl-5-pyrazolonimide, 3-methyl-5-pyrazolone, 1-phenyl-5-pyrazolone-3-carboxylic acid, 1-phenyl-5-pyrazolone-3-carboxamide, 1-(4-chlorophenyl)-5-pyrazolone-3-carboxylic acid, 1-(2,5-dichlorophenyl)-5-pyrazolone-3-carboxylic acid, 1-(3,4-dichlorophenyl)-5-pyrazolone-3-carboxylic acid, methyl or ethyl 1-phenyl-5-pyrazolone-3-carboxylate.

Further suitable activated methylene compounds are for example: 2,4-dihydroxyquinoline, 1-methyl-2,4-dihydroxyquinoline, 4-hydroxycoumarin, 2-acetonylbenzothiazole, 2,4-dihydroxycoumarin, dimedone, 2-hydroxy-3-naphtholcarboxylic acid, 1,3-cyclohexanedione, acetoacetic esters, cyanoacetic esters, malonic esters, benzenesulphonylacetic esters inter alia.

Suitable activated methylene compounds of the barbituric acid series, in particular of the formulae (II) and (III), are for example: barbituric acid and its derivatives, such as 2-amino-4,6-dihydroxypyrimidine, 2-cyanoamino-4,6-dihydroxypyrimidine, 2-ureido-4,6-dihydroxypyrimidine, 2-acetylamino-4,6-dihydroxypyrimidine, 2-benzoylamino-4,6-dihydroxypyrimidine, 2-methylsulphonylamino-4,6-dihydroxypyrimidine, 2-guanidino-4,6-dihydroxypyrimidine, 2-phenylsulphonylamino-4,6-dihydroxypyrimidine, 2-anilino-4,6-dihydroxypyrimidine; 2-(2-chloroanilino)-4,6-dihydroxypyrimidine, 2-(3-chloroanilino)-4,6-dihydroxypyrimidine, 2-(4-chloroanilino)-4,6-dihydroxypyrimidine; 2-(3,4-dichloroanilino)-4,6-dihydroxypyrimidine, 2-(2,5-dichloroanilino)-4,6-dihydroxypyrimidine; 2-(2-nitroanilino)-4,6-dihydroxypyrimidine, 2-(3-nitroanilino)-4,6-dihydroxypyrimidine, 2-(4-nitroanilino)-4,6-dihydroxypyrimidine; 2-(2-methoxyanilino)-4,6-dihydroxypyrimidine, 2-(4-methoxyanilino)-4,6-dihydroxypyrimidine, 2-(2-methylanilino)-4,6-dihydroxypyrimidine, 2-(4-methylanilino)-4,6-dihydroxypyrimidine; 2-(2,4-dimethylanilino)-4,6-dihydroxypyrimidine; 2-methylamino-4,6-dihydroxypyrimidine, 2-dimethylamino-4,6-dihydroxypyrimidine; 4,6-dihydroxypyrimidine; 2-butyl-4,6-dihydroxypyrimidine, 2-ethyl-4,6-dihydroxypyrimidine, 2-propyl-4,6-dihydroxypyrimidine, 2-hexyl-4,6-dihydroxypyrimidine, 2-benzyl-4,6-dihydroxypyrimidine, 2-phenyl-4,6-dihydroxypyrimidine; 1-methylbarbituric acid, 1-ethylbarbituric acid, 1-benzylbarbituric acid, 1-phenylbarbituric acid, 1-(4-chlorophenyl)-barbituric acid, 1-(2-chlorophenyl)-barbituric acid, 1-(3,4-dichlorophenyl)-barbituric acid, 1-(4-methylphenyl)-barbituric acid, 1-(2,4-dimethylphenyl)-barbituric acid, 1-(3-nitrophenyl)-barbituric acid, 1,3-dimethylbarbituric acid, 2-iminobarbituric acid, 2-guaniminobarbituric acid, 2-phenyliminobarbituric acid or 2-benzimidazol-2-ylaminobarbituric acid; other highly suitable compounds are barbituric acid derivatives having fused-on rings; for example 1H-benzo[4,5]imidazo[1,2-a]pyrimidine-2,4-dione or 8H-[1,2,4]triazolo[4,3-a]pyrimidine-2,4-dione and also its 3-methyl derivative.

In the case where the compounds listed above contain phenyl radicals or fused benzene rings, these rings can be further substituted, for example by 1–3 radicals from the series fluorine, chlorine, bromine, methyl, ethyl, methoxy, ethoxy, carboxyl, sulpho, cyano, nitro, carbamoyl, and a methyl or ethyl carboxylate radical.

Further diazo group acceptors which can be used according to the invention are for example known from the literature references EP-A1-93,306; M. Regitz, G. Maas in "Diazo Compounds; Properties and Synthesis", p. 326–435, Academic Press, 1986; Angew. Chemie 92, p. 754–755 (1980); Angew. Chemie 79, p. 786–801 (1967) and Helv. Chim. Acta 61, p. 97–117 (1978).

Subsequent to the azo group transfer, the diazo compounds formed can be further coupled to give azo compounds; suitable coupling components are the activated methylene compounds already mentioned above.

Further suitable coupling components of the pyrimidine series are for example: 4-amino-2,6-dihydroxypyrimidine, 2,4-diamino-6-hydroxypyrimidine, 4,6-diamino-2-hydroxypyrimidine, 4-amino-2-cyanoimino-6-hydroxypyrimidine, 2-phenyl-4-amino-6-hydroxypyrimidine, cytosine, orotic acid, 4-carbamoyl-2,6-dihydroxypyrimidine, 4-carboxy-6-hydroxy-2-phenylpyrimidine, 7-hydroxy-5-methyl-s-triazolo[1,5-a]pyrimidine, 2,5-dimethyl-7-hydroxy-s-triazolo[1,4-a]pyrimidine, 5,7-dihydroxy-s-triazolo[1,5-a]pyrimidine, 5,7-dihydroxy-2-methyl-s-triazolo[1,5-a]pyrimidine, 7-amino-5-hydroxy-2-methyl-s-triazolo[1,5-a]pyrimidine, 2,4-dihydroxy-pyrimido[1,2-a]benzimidazole, 4-amino-2-hydroxy-pyrimido[1,2-a]benzimidazole, 2H-pyrimido[2,1-b]benzothiazole-2,4(3H)-dione.

The salts of the formula (I) are known or can be prepared analogously to procedures known in the literature (cf. for example Chem. Ber. 100, p. 3725–3735 (1967); Annalen 270, 1 ff.).

For example, they can be obtained in a simple manner by reacting salts of the commercially readily available aminoguanidine with nitrous acid, which can be generated for example in situ from alkali metal and alkaline earth metal nitrites and strong acids or else from esters of nitrous acid. Suitable solvents for this reaction are for example: water, lower alcohols such as for example methanol, ethanol, methylglycol, acetonitrile, methylene chloride, chloroform, acetic acid as above, but preferably water.

The azidoformamidinium salts are, as a rule, stable towards heat until distinctly above 100° C. and are largely not shock-sensitive. Therefore, they can be readily isolated, for example by filtration with suction or evaporation of the solvent. However, they are preferably immediately reacted further in the medium in which they were prepared.

The diazo group transfer proceeds according to the following scheme:

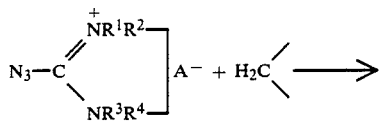

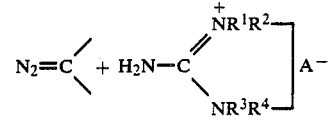

Suitable solvents for the diazo group transfer are for example water, lower alcohols such as methanol, ethanol, propanol, isopropanol, glycol, methylglycol, ethylglycol, and also acetone, acetonitrile, methylene chloride, chloroform, acetic acid, dimethylformamide, dimethyl sulphoxide and the like. As far as these solvents are miscible with water, they can also be used as mixtures with water. However, water is preferred as the solvent.

To effect a diazo group transfer, the azidoformamidinium salt is mixed with a suitable substrate in the solvent, and the mixture is kept for a while at temperatures, preferably between 0° and 100° C., particularly preferably between 20° and 80° C.

If a simple diazo group transfer is desired, at least equivalent amounts or an excess of the azidoformamidinium salt is used. If a coupling onto the same substrate is to follow the diazo group transfer, a double equivalent amount or an excess exceeding this amount of the substrate can be directly used.

If the reaction is carried out in an aqueous medium, that is in water or in mixtures consisting of water and another solvent, it is advisable to maintain a pH of ≦7, preferably ≦5, during the reaction.

The reaction products can be isolated in a conventional manner, for example by filtration with suction or evaporation of the solvent. In this step, it is advantageous that the guanidinium salts which are formed during the reaction as by-products are readily water-soluble and therefore, can, easily be separated off.

As a rule, the yields are high. The excellent suitability of azidoformamidinium salts for use as diazo group transfer agents was not foreseeable, since it is known from the literature that azidoformamidine readily rearranges to give aminotetrazole. In addition, many azido compounds are unsuitable for use as diazo group transfer agents.

The specific advantages of the azidoformamidinium salts are their simple and inexpensive preparation, their high thermal stability, their water solubility in combination with a high hydrolytic stability and also the water solubility of the guanidinium salts which are formed as by-products.

The invention further relates to the preparation of azo compounds of the formula $$D-N=N-A \qquad IV$$

in which
  A denotes the radical of a coupling component, preferably a methylene-active coupling component which is common in the chemistry of azo dyes, and
  D denotes the radical of an activated methylene compound, characterized in that an activated methylene compound D—H is reacted with an azidoformamidinium salt, preferably a compound of the formula (I), to give, by azo group transfer, a diazo compound, and that this compound is subsequently reacted with a coupling component of the formula H—A to give azo compounds of the formula (IV).

Coupling components and activated methylene compounds are preferably those compounds which have been mentioned above as examples.

In particular, the process is also suitable for preparing symmetrical compounds of the formula

A—N=N—A    V preferably for preparing azobarbituric acid.

Preferably, the preparation of compounds IV and V is carried out in an aqueous medium, at a pH of ≦7, preferably ≦5. The reaction conditions mentioned above for the diazo group transfer can equally be applied to the preparation of compounds (IV) and (V), especially in view of the fact that the intermediate diazo compounds are preferably not isolated.

The process is highly suitable for the synthesis of azobarbituric acid. In what follows, this synthesis is described in detail by way of example: to synthesize azobarbituric acid, it is advisable to conduct the reaction in aqueous solution or suspension.

The azidoformamidinium salt can be prepared directly in the reaction vessel by reacting a salt of aminoguanidine with nitrous acid which can be prepared in the reaction solution from a nitrite, for example an alkali metal nitrite, and a little more than the equivalent amount of an acid. Suitable salts of aminoguanidine and suitable acids are those whose anions correspond to those mentioned under $A^-$. The azidoformamidinium salt prepared in this manner in aqueous solution can be immediately further reacted with barbituric acid. The azide first reacts with the barbituric acid by diazo group transfer to give diazobarbituric acid which is then reacted in a second step with another molecule of barbituric acid to give a salt of the azobarbituric acid. The two reaction steps can be carried out separately in succession or even simultaneously, the reaction sequence depending mainly on the pH of the solution. At a pH below 3, preferably between 0.5 and 2.5, and at temperatures between 0° and 100°, preferably between 30° and 80°, the diazo group transfer proceeds much more rapidly than the subsequent coupling which is preferably carried out in a pH range of 3–7, preferably 4–6, at temperatures of 30°–100°, preferably 50°–100°. Thus, the reaction can be carried out such that a diazo group transfer to give diazobarbituric acid is first carried out in the lower pH range. This intermediate acid can also be isolated, in which case it is advisable to choose an azidoformamidinium salt/barbituric acid ratio of 1 to 1.2:1, or instead a coupling is carried out in the higher pH range after addition of further barbituric acid. It is also possible to add a larger amount of barbituric acid right at the beginning and first carry out the diazo group transfer at low pH values and then couple by simply increasing the pH. In this case, it is advisable to choose an azide/barbituric acid ratio of 1:2–2.2. Finally, it is also possible to carry out the diazo group transfer and the coupling simultaneously in the higher pH range. Of course, it is also possible to use a mixture of procedures or to increase the pH in several stages or to add the barbituric acid in several portions.

In the coupling, the azobarbituric acid is obtained in the form of its salts, for example as the sodium salt. If other cations are present, salts of these cations or even mixed salts can also be formed. Suitable cations are for example those which are derived from metallic sodium, potassium, calcium, strontium, barium, iron, cobalt, nickel, manganese or copper. These cations can be present from the start or instead can be added in the form of suitable salts before, during or after the coupling reaction.

EXAMPLES

Example 1

29.9 g (0.22 mol) of aminoguanidine bicarbonate are dissolved in a mixture of 150 ml of water and 54 ml of 10N hydrochloric acid, and the solution is cooled to 0° C. by adding ice. 50 ml of an aqueous solution of sodium nitrite containing 30 g of dissolved sodium nitrite per 100 ml are added dropwise to this mixture in the course of about 15 minutes. After 5 minutes, a nitrite excess which may be present is removed using amidosulphonic acid. 25.6 g (0.2 mol) of barbituric acid are thrown into the solution of azidoformamidinium hydrochloride thus obtained, and the mixture is heated at 70° C. for 4 hours and at 95° for 1 hour. The solution is then cooled down to 0°–5°, the precipitate is filtered off with suction and washed with ice-cold water. Drying at 70° in a through-circulation cabinet gives 27.8 g (90.2%) of diazobarbituric acid of the formula

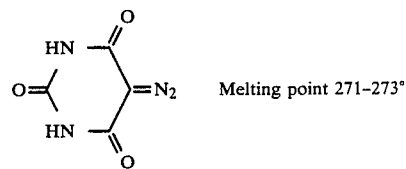

Melting point 271–273°

Example 2

53.8 g (0.42 mol) of barbituric acid are added to a solution of azidoformamidinium hydrochloride prepared analogously to Example 1 starting from 27.2 g (0.2 mol) of aminoguanidine bicarbonate, and the mixture is first heated to 50° for 1.5 hours and, after adding 6 g of sodium acetate is kept at 50° for another 0.5 hour to give a yellowish suspension of diazobarbituric acid as a mixture containing excess barbituric acid. The pH is then brought to about 4.5–4.7 using about 24 ml of 10N sodium hydroxide solution, and the mixture is heated at 95° for another 3 hours. The red precipitate is filtered off with suction, washed with water and dried at 70° in a through-circulation cabinet.

This gives 66.7 g (98%) of the monosodium salt of azobarbituric acid of the formula

The product crystallizes with 2 mol of water $C_8H_5N_6NaO_6 \cdot 2H_2O$ (340.2);

calculated N 24.7%; found N 24.7%.

Example 3

Example 2 is repeated except that an equivalent amount of 2-cyanoimino-4,6-dihydroxypyrimidine instead of barbituric acid is used to give 77.7 g of a product of the formula

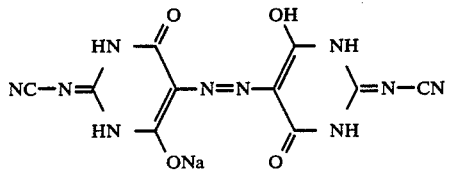

The product crystallizes with 2.5 mol of water $C_{10}H_5N_{10}NaO_4 \cdot 2.5H_2O$ (397.3)

Calculated N 35.3%; found N 35.4%; calculated C 30.2%; found C 30.4%.

Example 4

68.7 g of 1,3-dimethyl-4-imino-barbituric acid are heated together with 200 ml of water and 70 ml of 10N hydrochloric acid at 80° C. for 1 hour, and the batch is then adjusted to a pH of 3. To the solution of 1,3-dimethylbarbituric acid thus obtained, is added a solution of azidoformamidinium hydrochloride prepared analogously to Experiment 1, and the mixture is further reacted as in Experiment 1 to give 67.6 g of a product of the formula

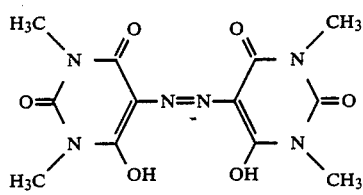

The product is present as the ammonium salt. $C_{12}H_{17}N_7O_0 \cdot 5H_2O$ (364.3)

Calculated N 26.9%; found N 27.1%; calculated C 39.6%; found C 39.8%.

I claim:

1. A process of preparing diazo compounds comprising a transfer of diazo groups to activated methylene compounds comprising reacting an activated methylene compound with a diazo transferring agent, wherein the diazo transferring agent is an azidoformamidinium salt of the formula

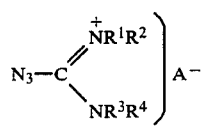

in which $R^1$, $R^2$, $R^3$, $R^4$ denote hydrogen, alkyl, cycloalkyl, aralkyl or wherein $R^1+R^2$, $R^3+R^4$ and $R^2+R^3$ form a 5- or 6-membered ring including the N atom and $A^-$ stands for an anion, said transfer being conducted at a temperature of 0° to 100° C. with from an equimolar amount to an excess amount of the azidoformamidinium salt and in the presence of a solvent suitable for diazo transfer.

2. A process according to claim 1, wherein the azidoformamidinium salt is

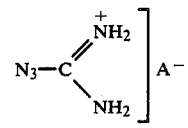

3. A process according to claim 1, wherein the activated methylene compound is derived from the acetoacetic arylide, pyrimidine, pyridine, pyrazole or 2,4-dihydroxyquinoline radical or corresponds to the formulae

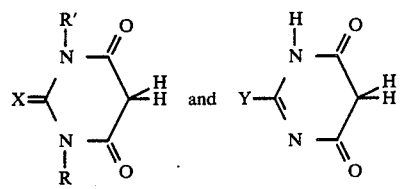

in which
X denotes =O, =N—CN or =NR$^5$,
R$^5$ denotes R,
R, R' denote hydrogen, alkyl, cycloalkyl, aryl, aralkyl and
Y denotes R, a heterocyclic radical which contains 1, 2 or 3 heteroatoms selected from the group consisting of N, O, S and mixtures thereof or a radical —NR$^{10}$R$^{11}$ where R$^{10}$, R$^{11}$ denote R.

4. A process according to claim 3, wherein
R, R' denote hydrogen, C$_1$-C$_6$-alkyl, C$_3$-C$_7$-cycloalkyl, phenyl, naphthyl, phenyl-C$_1$-C$_4$-alkyl, the hydrocarbon radicals being unsubstituted or substituted by —OH, F, Cl, Br, C$_1$-C$_6$-alkyl, C$_1$-C$_6$-alkoxy, —NO$_2$, —CN, —SO$_2$NR$^6$R$^7$ or —CONR$^8$R$^9$,
R$^6$, R$^7$, R$^8$, R$^9$ denote hydrogen, C$_1$-C$_6$-alkyl, C$_3$-C$_7$-cycloalkyl, phenyl, naphthyl, phenyl-C$_1$-C$_4$-alkyl, the hydrocarbons for R$^6$, R$^7$, R$^8$, R$^9$ being unsubstituted or substituted by —OH, F, Cl, Br, C$_1$-C$_6$-alkyl, C$_1$-C$_6$-alkoxy, —NO$_2$, —CN or R$^6$ and R$^7$ and R$^8$ and R$^1$ together with the N atom form a piperidine or morpholine ring,
Y is R or a heterocyclic radical or a radical

wherein R$^{10}$, R$^{11}$ is R.

5. Preparation of diazobarbituric acid according to claim 1.

6. A process according to claim 1, wherein the reaction is carried out in an aqueous medium at a pH of ≦7.

7. A process according to claim 1, wherein the reaction is carried out in an aqueous medium at a pH of ≦5.

8. A process according to claim 1, wherein said solvent is water, a lower alcohol, acetone, acetonitrile, methylene chloride, chloroform, acetic acid, dimethylformamide or dimethyl sulphoxide.

9. A process according to claim 1, wherein the 5- or 6-membered ring is a piperidine or pyrrolidine ring.

10. A process according to claim 1, wherein R$^1$, R$^2$, R$^3$ and R$^4$ denote hydrogen, C$_1$-C$_6$-alkyl, C$_3$-C$_7$-cycloalkyl, benzyl or phenethyl.

11. A process according to claim 1, wherein $R^1$, $R^2$, $R^3$ and $R^4$ denote hydrogen, $C_1$-$C_6$-alkyl, $C_3$-$C_7$-cycloalkyl, benzyl, phenethyl or wherein $R^1+R^2$, $R^3+R^4$ and $R^2+R^3$ including the N atom or the N atoms and C atom form a piperidine or a pyrrolidine ring.

12. A process of preparing azo compounds of the formula $$D\!-\!N\!=\!N\!-\!A \qquad (IV)$$

in which
 A denotes the radical of the coupling component and
 D denotes the radical of an activated methylene compound, comprising reacting an activated methylene compound with an azidoformamidinium salt to give, by azo group transfer, a diazo compound which is subsequently reacted with a coupling component H—A to give azo compounds of the formula IV.

13. Preparation of azobarbituric acid according to claim 12.

14. A process according to claim 12, wherein the azidoformamidinium salt is of the formula

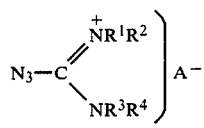

in which
 $R^1$, $R^2$, $R^3$, $R^4$ denote hydrogen, alkyl, cycloalkyl, aralkyl or wherein $R^1+R^2$, $R^3+R^4$ and $R^2+R^3$ form a 5- or 6-membered ring including the N atom or N atoms and $A^-$ stands for an anion and said transfer being conducted at a temperature of 0° to 100° C. with from an equimolar amount to an excess amount of the azidoformamidinium salt and in the presence of a solvent suitable for transfer.

* * * * *

UNITED STATES PATENT AND TRADEMARK OFFICE
CERTIFICATE OF CORRECTION

PATENT NO. : 4,942,225

DATED : July 17, 1990

INVENTOR(S) : Manfred Lorenz

It is certified that error appears in the above-identified patent and that said Letters Patent is hereby corrected as shown below:

Col. 1, line 55   Delete " 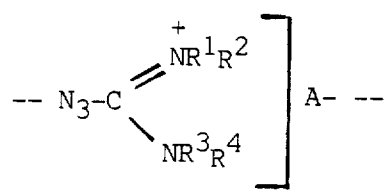 A- " and substitute $$-- \left[ N_3-C \begin{array}{c} =\overset{+}{N}R^1R^2 \\ \diagdown NR^3R^4 \end{array} \right] A- --$$

Col. 2, line 7   Delete " 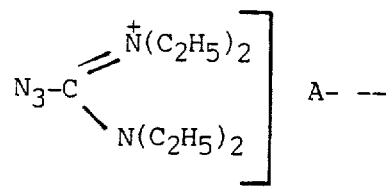 A- "

and substitute -- $\left[ N_3-C \begin{array}{c} =\overset{+}{N}(CH_3)_2 \\ \diagdown N(CH_3)_2 \end{array} \right] A-$ , $\left[ N_3-C \begin{array}{c} =\overset{+}{N}(C_2H_5)_2 \\ \diagdown N(C_2H_5)_2 \end{array} \right] A-$ --

UNITED STATES PATENT AND TRADEMARK OFFICE
CERTIFICATE OF CORRECTION

PATENT NO. : 4,942,225          Page 2 of 2

DATED : July 17, 1990

INVENTOR(S) : Manfred Lorenz

It is certified that error appears in the above-identified patent and that said Letters Patent is hereby corrected as shown below:

Col. 10, claim 4 lines 34, 40 and 43   Delete ", " (3rd occur.) and substitute --or--

Col. 10, claim 4 line 44   Delete " $R^1$ " and substitute -- $R^9$ --

Col. 10, claim 4 line 46   After 1st " radical " insert -- which contains 1, 2 or 3 heteroatoms selected from the group consisting of N,O,S and mixtures thereof --

Signed and Sealed this

Fourth Day of August, 1992

Attest:

DOUGLAS B. COMER

Attesting Officer         Acting Commissioner of Patents and Trademarks

UNITED STATES PATENT AND TRADEMARK OFFICE
CERTIFICATE OF CORRECTION

PATENT NO. : 4,942,225

DATED : July 17, 1990

INVENTOR(S) : Manfred Lorenz

It is certified that error appears in the above-identified patent and that said Letters Patent is hereby corrected as shown below:

Col. 2, line 15 Delete " $-C\begin{bmatrix} \overset{+}{N}H_2 \\ NH_2 \end{bmatrix} A^-$ " and substitute -- $-C\begin{bmatrix} \overset{+}{N}H_2 \\ NH_2 \end{bmatrix} A^-$ --

Col. 5, line 65 Delete " $-C\begin{bmatrix} \overset{+}{N}R^1R^2 \\ NR^3R^4 \end{bmatrix} A^-$ " and substitute -- $-C\begin{bmatrix} \overset{+}{N}R^1R^2 \\ NR^3R^4 \end{bmatrix} A^-$ --

Col. 6, line 5 Delete " $-C\begin{bmatrix} \overset{+}{N}R^1R^2 \\ NR^3R^4 \end{bmatrix} A^-$ " and substitute -- $-C\begin{bmatrix} \overset{+}{N}R^1R^2 \\ NR^3R^4 \end{bmatrix} A^-$ --

Signed and Sealed this

First Day of December, 1992

Attest:

DOUGLAS B. COMER

Attesting Officer

Acting Commissioner of Patents and Trademarks